US010649414B2

(12) United States Patent
Sangi

(10) Patent No.: US 10,649,414 B2
(45) Date of Patent: *May 12, 2020

(54) ADAPTIVE CROSS PLANT CONTROL AND STEERING SYSTEM, AND CORRESPONDING METHOD THEREOF

(71) Applicant: Bühler AG, Uzwil (CH)

(72) Inventor: Daryoush Sangi, Winterthur (CH)

(73) Assignee: BÜHLER AG, Uzwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/562,273

(22) PCT Filed: Dec. 18, 2015

(86) PCT No.: PCT/EP2015/080573
§ 371 (c)(1),
(2) Date: Sep. 27, 2017

(87) PCT Pub. No.: WO2016/155857
PCT Pub. Date: Oct. 6, 2016

(65) Prior Publication Data
US 2018/0088541 A1   Mar. 29, 2018
US 2018/0314215 A9   Nov. 1, 2018

(30) Foreign Application Priority Data

Mar. 27, 2015   (CH) ..................................... 0446/15

(51) Int. Cl.
G05B 13/02   (2006.01)
G05B 19/045   (2006.01)
(Continued)

(52) U.S. Cl.
CPC ............ *G05B 13/021* (2013.01); *F01K 13/02* (2013.01); *F22B 35/18* (2013.01); *G05B 19/045* (2013.01);
(Continued)

(58) Field of Classification Search
CPC .... G05B 13/021; G05B 19/045; G05B 19/05; G05B 2219/13009; G05B 2219/1128;
(Continued)

(56) References Cited

U.S. PATENT DOCUMENTS 6,799,080 B1 *  9/2004  Hylden ................ G05B 19/409
340/3.1
7,089,530 B1 *  8/2006  Dardinski .............. G05B 15/02
700/83

(Continued)

OTHER PUBLICATIONS

"OPC Unified Architecture—Pioneer of the 4th industrial (r)evolution—OPC UA", Mar. 1, 2014 (Mar. 1, 2014), pp. 1-36, XP055176088, Retrieved from the Internet: URL: https://opcfoundation.org/wp-content/uploads/2014/03/OPC UA I 4.0 Pioneer US v2.pdf [retrieved on Mar. 12, 2015].

(Continued)

*Primary Examiner* — Charles R Kasenge
(74) *Attorney, Agent, or Firm* — Armstrong Teasdale LLP

(57) ABSTRACT

An adaptive process control system and corresponding method for independent steering of plant control systems is provided, wherein a plant associated with the plant control system includes a plurality of interlocked elements of one or more operational unit of the plant. The operation of an operational unit is controlled by the plant control system by means of the elements interlocked to the plant control system, wherein the adaptive, independent process control system is accessible by a plant process engine including a plant controller unit connected via the supervisory control and data acquisition unit with at least one programmable logic controller of the plant control system. The operation of the plant and the operational units is controlled by means of the programmable logic controller and the plurality of interlocked elements.

12 Claims, 6 Drawing Sheets

(51) Int. Cl.

| | | |
|---|---|---|
| *H04W 4/00* | (2018.01) | |
| *H04W 4/70* | (2018.01) | |
| *F22B 35/18* | (2006.01) | |
| *F01K 13/02* | (2006.01) | |
| *G05B 19/05* | (2006.01) | |
| *H04L 29/06* | (2006.01) | |
| *G05B 19/418* | (2006.01) | |
| *H04L 29/08* | (2006.01) | |

(52) U.S. Cl.
CPC .............. *G05B 19/05* (2013.01); *H04L 67/42* (2013.01); *H04W 4/70* (2018.02); *G05B 19/4186* (2013.01); *G05B 2219/1128* (2013.01); *G05B 2219/13009* (2013.01); *G05B 2219/34263* (2013.01); *H04L 67/12* (2013.01); *Y02P 90/185* (2015.11); *Y02P 90/28* (2015.11); *Y02P 90/86* (2015.11)

(58) Field of Classification Search
CPC ...... G05B 19/4186; G05B 2219/34263; H04L 67/42; H04L 67/12; H04W 4/70; H04W 4/005; F22B 35/18; F01K 13/02; Y02P 90/86; Y02P 90/28; Y02P 90/185
See application file for complete search history.

(56) References Cited

U.S. PATENT DOCUMENTS

| | | | | |
|---|---|---|---|---|
| 7,096,465 | B1* | 8/2006 | Dardinski | G05B 19/0426 717/121 |
| 7,272,815 | B1* | 9/2007 | Eldridge | G06F 8/71 707/999.009 |
| 7,603,183 | B1* | 10/2009 | Munemoto | G05B 19/05 700/17 |
| 9,043,868 | B2* | 5/2015 | Byres | H04L 41/0806 713/164 |
| 9,411,759 | B2* | 8/2016 | Ramsay | G06F 13/385 |
| 9,568,909 | B2* | 2/2017 | Lawson | G05B 19/4185 |
| 9,660,994 | B2* | 5/2017 | McQuillan | H04L 63/1433 |
| 2009/0198349 | A1* | 8/2009 | Carpenter | G05B 23/0221 700/12 |
| 2009/0210071 | A1* | 8/2009 | Agrusa | G05B 23/0267 700/9 |
| 2009/0210814 | A1* | 8/2009 | Agrusa | G05B 23/0267 715/772 |
| 2010/0100654 | A1* | 4/2010 | Ramsay | G06F 13/385 710/100 |
| 2011/0016514 | A1 | 1/2011 | De Carlo et al. | |
| 2011/0060427 | A1* | 3/2011 | Batke | G05B 23/0267 700/79 |
| 2011/0264289 | A1* | 10/2011 | Sawyer | H01L 31/02021 700/287 |
| 2012/0151558 | A1* | 6/2012 | Byres | H04L 41/0806 726/3 |
| 2012/0259435 | A1* | 10/2012 | Ramsay | G06F 13/385 700/1 |
| 2012/0268256 | A1* | 10/2012 | Akiyama | H04L 63/1408 340/425.1 |
| 2012/0290105 | A1 | 11/2012 | Balint et al. | |
| 2012/0310381 | A1* | 12/2012 | Karaffa | G05B 19/418 700/80 |
| 2012/0310382 | A1* | 12/2012 | Karaffa | G05B 19/4186 700/80 |
| 2012/0310383 | A1* | 12/2012 | Karaffa | G05B 19/41865 700/80 |
| 2012/0331104 | A1* | 12/2012 | Akiyama | H04L 63/1408 709/217 |
| 2013/0212078 | A1* | 8/2013 | Wilson | H04L 63/1416 707/698 |
| 2013/0232338 | A1* | 9/2013 | Byres | H04L 41/0806 713/162 |
| 2015/0248122 | A1* | 9/2015 | Norwood | G06Q 30/0621 700/87 |
| 2016/0094578 | A1* | 3/2016 | McQuillan | H04L 63/1433 726/23 |
| 2016/0330225 | A1* | 11/2016 | Kroyzer | G06F 21/552 |

OTHER PUBLICATIONS

PCT International Search Report, Application No. PCT/EP2015/080573, dated Mar. 30, 2016, 3 pgs.

\* cited by examiner

ADAPTIVE CROSS PLANT CONTROL AND STEERING SYSTEM, AND CORRESPONDING METHOD THEREOF

CROSS REFERENCE TO RELATED APPLICATIONS

This patent application is a National Stage Entry of PCT/EP2015/080573 filed on Dec. 18, 2015, which claims the benefit and priority of Switzerland Patent Application No. 00446/15 filed on Mar. 27, 2015, the disclosures of which are incorporated herein by reference in their entirety as part of the present application.

BACKGROUND

The present disclosure generally relates to the field of computerized process control. More particularly, the present disclosure relates to a secure architecture for a platform independent executing of process control operation and applications. Most particularly, the present disclosure relates to an adaptive process control system for independent steering of plant control systems, wherein a plant associated with the plant control system includes a plurality of interlocked elements of one or more operational unit of the plant. In these systems, the operation of the operational units are controlled by the plant control system via the elements interlocked to the plant control system. Finally, the disclosure is related to a generalized human machine interface based on the adaptive process control system.

In the last decade, significant advances in industrial process control technology have vastly improved all aspects of factory and plant operation. Before today's modern industrial process control systems, industrial processes were operated and controlled by humans and rudimentary mechanical controls. As a consequence, the complexity and degree of control over a process was limited by the speed with which a human could ascertain a present status of various process state variables, compare the current status to a desired operating level, calculate a corrective action (if needed), and implement a change to a control point to affect a change to a state variable. Improvements to the process control technology were enabling larger and more complex industrial processes to be controlled via programmed control processors. Control processors execute control and/or steering programs that read process status variables, execute instruction commands associated with control algorithms based upon the status variable data and desired set point information to render output values for the control points in industrial processes. Such control processors and programs support a substantially self-running industrial process. In spite of the ability of industrial processes to operate under the control of programmed process controllers at previously established operational parameters without human intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Manufacturing and process control systems are modified due to changes in the process control devices and the processes themselves. Thus, it is important to provide means for quickly configuring/re-configuring without touching unchanged portions of the system. It is also important to provide means for making such changes while minimizing disruptions to the operation of the industrial process, e.g., minimizing the time that the process stands idle. Further, in view of the need to continually improve supervisory process control and process/manufacturing information systems, there is a strong desire to not be locked into a single architecture for a supervisory process control and manufacturing information system. Process control systems change and it is desirable to have higher-level systems that adapt to such changes regardless of their magnitude. Furthermore, less flexible supervisory process control and manufacturing information system offerings require designers of process control installations to take into consideration the long-term requirements of an application because of the relative inflexibility of the application to modifications once it is installed. Such application inflexibility of plant control systems is undesirable though at the present point inevitable in the conservative industrial control systems market. The process control industry tends to pilot, and often the designers are not fully aware of the full extent and form of the automation that will ultimately be incorporated in a final installation. Later in the life of a plant, when new functionality is added the new control system components leverage or merge existing systems. In such instances where the process control system has changed significantly, there are advantages to incorporating a different architecture into the installed supervisory process control application. In prior art systems, the whole mostly manufacturer-specific plant control systems has to be costly rebuild by programming experts of the specific manufacturer.

An important feature of modern plant control systems are the so-called PLCs, i.e. the programmable logic controllers. The programmable controller is a electronic, digital processor unit used for automation of typically industrial electromechanical processes, such as control of machinery on factory assembly lines, steered robot production lines, or light fixtures. PLCs are used in many industries and machines. PLCs are designed for multiple analogue and digital inputs and output arrangements, extended temperature ranges, immunity to electrical noise, and resistance to vibration and impact. Programs to control machine operation are typically stored in battery-backed-up or non-volatile memory. A PLC is a so-called hard real-time system since output results must be produced in response to input conditions within a limited time, otherwise unintended operation will result. Before the development of PLCs, control, sequencing, and safety interlock logic for automated manufacturing lines etc. were mainly composed of relays, cam timers, drum sequencers, and dedicated closed-loop controllers. However, for more complex processes, there were hundreds or thousands needed of them, and the process for updating such facilities for the yearly model change-over was immensely time consuming and expensive, as electricians needed to individually rewire the relays to change their operational characteristics. With regard to the programmable aspect of the PLC, a PLC is more or less a small processor-based device with a built-in operating system. This operating system is highly specialized to handle the discussed incoming events in real time, i.e., at the time of their occurrence. The PCL is user programmable, allowing to control the operation of an associated plant or the like, whereas the PLC has said input lines where sensors are connected to notify upon events (e.g. temperature above/below a certain level, liquid level reached, etc.), and output lines to signal any reaction to the incoming events (e.g. start an engine, open/ close a valve, etc.). PLC uses languages as e.g. "Relay Ladder or RLL (Relay Ladder Logic). As the name "Relay Ladder Logic" implies, the control logic of the earlier days, which was built from relays, is being simulated by the structure of the instruction commands of the RLL. Other instructions command structures for PLC of the state of the art are e.g. called "sequential function chart", "functional block diagram", "structured text", or "instruction list".

Thus, PLCs are devices for controlling or regulating machinery or industrial installations. The elements employed therefor are usually housed in what are referred to as modules, with a module being defined as a self-contained object that can in turn consist of individual subassemblies and components. A module is thus a constituent part of an industrial installation or automation system and serves, by means of its programmable logic controller, to control or regulate the relevant equipment and machinery belonging to the installation. Modules are the interfaces to industrial processes. A range of modules enables all kinds of functions to be accommodated on a modular basis. Modules thus support a wide variety of technological tasks and offer extensive communication possibilities. A module's practical deployment requires relevant components of the automation installation or system to be electrically connected to the module. For example, it is necessary for various sensors and actuators that are used for the purpose of automating an installation to be connected to the modules that are used for providing the control.

As mentioned, PLCs are typically used to control machinery. Control sequences to be performed by PLCs consists in instructional commands on instructions to turn on and off outputs based on input conditions and the internal control sequence. In contrast to normal programs, PLC control sequences are designed to be programmed once, and run repeatedly as needed. In fact, PLCs can control not only simple devices such as a garage door opener, but a whole building or plant, including switching lights on and off at certain times, monitoring a custom built security system, etc. However, PLCs normally are found inside of a machine in an industrial environment. A PLC can run an automatic machine for years with little human intervention. They are designed to withstand most harsh environments.

As mentioned above, the PLC structure still relays on the historic control of machines by relays. When the first electronic machine controls were designed, they used relays to control the machine logic (i.e. press "Start" to start the machine and press "Stop" to stop the machine). Though, a machine can need a wall covered by relays to control all of its functions, this basic technology is almost completely failure resistant. There are only a few limitations and disadvantage to this type of machine control, as (i) relays failure, (ii) the delay when the relay turns on/off, and (iii) there is a huge amount of relays needed to design/wire/troubleshoot. PLCs overcomes these limitations of relays setup by its machine-controlled operation.

However, also PLCs have disadvantages. In the recent years, PLCs were becoming more and more intelligent. PLCs have been integrated into electrical communications (e.g. data transmission networks). So, all the PLCs in an industrial environment can be plugged into a network, which is usually hierarchically organized. The PLCs are then supervised by a control center. There exist many proprietary types of networks and process control systems. One type, which is widely known, is SCADA (Supervisory Control and Data Acquisition). However, most of the PLC still follows manufacture-proprietary designs. In general, a PLC is a purpose-built machine control processor driven device designed to read digital and analog inputs from various sensors, execute a user defined logic command sequence, and write the resulting digital and analog output values to various output elements like hydraulic and pneumatic actuators, indication lamps, solenoid coils, etc. As for the scan cycle, exact details vary between manufacturers, but most PLCs follow a 'scan-cycle' format. PLC's overhead includes testing I/O module integrity, verifying that the user command sequence logic has not changed, that the control unit itself has not locked up (e.g. via a watchdog timer), and any other necessary communications. Communications may include traffic over the PLC programmer port, remote I/O racks, and other external devices such as HMIs (Human Machine Interfaces). For the PLCs input scan, a snapshot of the digital and analog values present at the input cards is saved to an input memory table. For the logic execution, the user command sequence, i.e. program or algorithm, is scanned element by element, and sequentially operated until the end of the sequence, whereas resulting values are written to an output memory table. In PLCs, diagnosis and communication is used in different ways with variations in the use of logics, analytics, and experience to determine "cause and effect". Mostly, in PLC engineering, it is used to determine the causes of symptoms, mitigations, and solutions, which are then communicated to the input module and/or used to send appropriate messages to the output module for any incorrect data files variations. Finally, for the output scan, values from the resulting output memory table are written to the output modules. Once the output scan is complete the process repeats itself until the PLC is powered down. The time it takes to complete a scan cycle is called the scan cycle time ranging from hundreds of milliseconds (typically on older PLCs, and/or PLCs with very complex programs) to only a few milliseconds on newer PLCs, and/or PLCs executing short, simple code. Apart from these general features, which can be found by almost all PLCs, already the basic command instructions vary widely in their specific nomenclature and operational details between PLC manufacturers. In addition, often implementation details evolve from generation to generation. It is a major disadvantage of the prior art system, that especially for inexperienced PLC operators or programmer, it is quasi impossible to keep the nomenclature straight from manufacturer to manufacturer. Thus, there is a strong dependency to the manufacturer of the PLC to keep the operation of a system or plant, which is operated by the corresponding PLCs, running and up-to-date. So much the worst, if even only very simple parts have to be replaced, complemented, cut down or scaled, expensive operators form the manufacturer have to be paid to modify or adapt the PLC command instruction sequence.

SCADA (Supervisory Control and Data Acquisition), as mentioned above, generally refers to a system operating with coded signals over communication channels to provide control of remote equipment, as PLCs, thereby using typically one communication channel per remote station. SCADA control systems may be combined with a data acquisition system by adding the use of coded signals over communication channels to acquire information about the status of the remote equipment for display or for recording functions (cf. B. Galloway et al., Introduction to Industrial Control Networks, IEEE Communications Surveys and Tutorials, 2012, in the following incorporated by reference). SCADA refers to a special type of industrial control system (ICS). Industrial control systems are processor-based systems that monitor and control industrial processes existing in the physical world. However, SCADA systems distinguish from other ICS systems by being able to hold large-scale processes that can include multiple sites, and large distances. These processes include industrial, infrastructure, and facility-based processes, whereas (i) industrial processes include manufacturing, production, power generation, fabrication, and refining, and may run in continuous, batch, repetitive, or discrete modes, (ii) infrastructure processes include inter alia water treatment and distribution, wastewater collection and treatment, oil and gas pipelines, electrical power transmission and distribution, wind farms, civil defense siren systems, and large communication systems, and (iii) facility processes occur both in public facilities and private ones, including buildings, airports, ships, and space stations. These processes can monitor and control heating, ventilation, and air conditioning systems (HVAC), access, and energy consumption etc.

SCADA systems typically include or are connected to the following subsystems: (i) Remote terminal units (RTUs) connect to sensors in the process and convert sensor signals to digital data. RTUs have telemetry hardware capable of sending digital data to the supervisory system, as well as receiving digital commands from the supervisory system. RTUs can have embedded control capabilities such as ladder logic in order to accomplish Boolean logic operations, (ii) programmable logic controller (PLCs), as already discussed above, connect to sensors in the process and convert sensor signals to digital data. PLCs have more sophisticated embedded control capabilities (typically one or more IEC 61131-3 programming languages) than RTUs. PLCs do not have telemetry hardware, although this functionality can be installed alongside. PLCs are sometimes used in place of RTUs as field devices because they are more economical, versatile, flexible, and configurable, (iii) a telemetry system is typically used to connect PLCs and RTUs with control centers, data warehouses, and the enterprise. Examples of wired telemetry media used in SCADA systems include leased telephone lines and WAN circuits. Examples of wireless telemetry media used in SCADA systems include satellite (VSAT), licensed and unlicensed radio, cellular and microwave, (iv) at least one data acquisition server, i.e. a software driven module which uses industrial protocols to connect software services, via telemetry, with field devices such as RTUs and PLCs. It allows clients to access data from these field devices using standard protocols, (v) a human-machine interface (HMI), which is the apparatus or device which presents processed data to a human operator, and through this, the human operator monitors and interacts with the process. The HMI is a client that requests data from a data acquisition server, (vi) a so called software-driven Historian module which accumulates time-stamped data, Boolean events, and Boolean alarms in a database which can be queried or used to populate graphic trends in the HMI. The historian is a client that requests data from a data acquisition server, (vii) a supervisory processor-based system, gathering (acquiring) data on the process and sending commands (control) to the SCADA system, (ix) communication infrastructure connecting the supervisory system to the remote terminal units, and (x) typically various processes and analytical instrumentation. Thus, SCADA based systems allow providing centralized control systems which monitor and control entire sites, or complexes of systems spread out over large areas (anything from an industrial plant to a nation). Most control actions are performed automatically by RTUs or by PLCs. Host control functions are usually restricted to basic overriding or supervisory level intervention. For example, a PLC may control the flow of cooling water through part of an industrial process. The SCADA system now can allow operators to change the set points for the flow, and enable alarm conditions, such as loss of flow and high temperature, to be displayed and recorded. The feedback control loop passes through the RTU or PLC, while the SCADA system monitors the overall performance of the loop.

It is to be mentioned that digital computing units, as general-purpose programmable devices, were also applied to control of industrial processes. However, most of the plant control system have a manufacturer-specific interface and communication environment, so that accessing and steering of the plant control system typically requires specialist programmers, and stringent operating environmental control. Further, using a general-purpose computer for direct process control requires protecting the computer from the plant floor conditions. Thus, an industrial plant control computer must have several attributes: it must tolerate the environmental plant conditions, it must support discrete (bit-form) input and output in an easily extensible manner, it must not require years of training to use, and it must permit its operation to be monitored. The response time of any such system must be fast enough to be useful for control, wherein the required speed may vary according to the nature of the process. Since many industrial processes have timescales easily addressed by millisecond response times, modern (fast, small, reliable) electronics greatly facilitate building reliable controllers, especially because performance can be traded off for reliability. In summary, the prior art does not provide a generalized plant control system, which can be easily applied to any manufacturer-specific control system, platform independently, and which copes with the requirements of industrial plant control systems.

In the state of the art, OPC Unified Architecture (OPC UA) is know as an industrial M2M communication protocol for interoperability. OPC UA is developed by the OPC Foundation and is the successor to Open Platform Communications (OPC). OPC UA differs significantly from its predecessor. In contrast to the original OPC communications model, OPC-UA provides a cross-platform service-oriented architecture (SOA) for process control, while enhancing security and providing an information model. Thus, the OPC UA overcomes the proprietary problems of the original OPC, which was based on the Microsoft Windows only process exchange COM/DCOM, whereas DCOM is the short for Distributed Component Object Model, which is a proprietary Microsoft technology for communication among software components distributed across networked computers. DCOM, also referred as "Network OLE", extends Microsoft's COM, and provides the communication frame under Microsoft's COM+ application server infrastructure. The addition of the "D" to COM refers to the use of DCE/RPC (Distributed Computing Environment/Remote Procedure Calls), and of the modified version of DCE/RPC, the Microsoft's enhanced version MSRPC (Microsoft Remote Procedure Call).

As mentioned, the OPC UA architecture is a service-oriented architecture (SOA) and is based on different logical levels. OPC Base Services are abstract method descriptions, which are protocol independent and provide the basis for OPC UA functionality. The transport layer puts these methods into a protocol, which means it serializes/deserializes the data and transmits it over the network. Two protocols are specified for this purpose. One is a binary TCP protocol, optimized for high performance and the second is Web service-oriented. The OPC information model is a Full Mesh Network based on nodes, whereas the nodes can include any kind of meta information. The OPC UA network nodes are treatable similar to objects in an object-oriented programming (OOP). Such objects can include attributes for read access (DA, HDA), methods, and triggered events that can be transmitted (AE, DataAccess, DataChange). Nodes hold for process data as well all other types of metadata. Therefore, OPC UA provides two core elements. First of all, the Microsoft Windows-specific protocol DCOM, which was the basis of the predecessor OPC, is replaced by open, platform-independent protocols with integrated security mechanisms. Secondly, the OPC features, such as Data Access, Alarms & Events and Historical Data Access, are transported in an object-oriented model and supplemented by additional features, such as methods and type systems. As a result, the OPC UA interface can be directly integrated into systems on arbitrary platforms with different programming languages, and arbitrary complex systems can captured completely with OPC UA. The object-oriented rules according to which the address space of an OPC UA server is structured and the OPC UA interface for accessing takes a form that OPC UA can be regarded as a network-capable programming language. However, note that OPC UA becomes specialized for automation technology through specific information models such as Data Access, Alarms & Conditions, Historical Access and Programs.

OPC UA consists of a list of specifications with the described basic functions and the information models based on these functions, such as Data Access and Alarms & Conditions. Specifications that define further information models beyond that are normally referred to as Companion Specifications. In the prior art, various OPC UA Companion Specifications were developed defining an information model for special branches of industry or areas of application. Example for such Companion Specifications are the specification OPC UA for Analyzer Devices (ADI), which was created on the basis of customer requirements and developed by a working group of OPC members within the OPC Foundation, or the information model OPC UA for IEC 61131-3, which was created with PLCopen defining an OPC UA information model for a standard outside the OPC Foundation. Finally, to use OPC UA for steerable or programmable devices, there exist a model for the configuration of hardware and software components, which was created in the common working group of OPC Foundation, Profibus User Organization (PNO), HART Foundation, Fieldbus Foundation (FF) and Field Device Tool (FDT) for the standardized configuration of field devices. This base model was released by the OPC Foundation as an independent information model and, in some cases, did serve as the basis for further standards such as OPC UA for Analyzer Devices and OPC UA for IEC 61131-3. The information model defines base types for configurable components and devices, it defines concepts for the logical grouping of parameters, methods and components and it defines points of entry in the OPC UA server address space. Besides that, information for the identification of devices and the available protocols is defined. However, one of the main drawbacks of the OPC UA remains in the fact that OPC UA allows only to handle and communicate structured data from one OPC UA client to another OPC UA client. Thus, OPC UA only provides a mere data transport container without allowing to directly control or steer any remote devises, associated with an OPC UA client within the OPC UA network.

BRIEF DESCRIPTION

The present disclosure provides a system and method for plant operation control systems and supervisory process control applications with regard to adapting to changed process control system architectures. An platform-independent supervisory process control and manufacturing information system application architecture is described that enables the system framework to be easily designed and altered for customized use under different plant system manufacturer standards. In accordance with the disclosed layered application architecture, an application object is hosted by an engine. The engine is hosted by a platform that corresponds to, for example, a personal computer with infrastructure software. The intermediate engine layer abstracts the application object from the platform architecture. Thus, location within a physical manufacturer-specific system containing the application object respectively the plant control need not be addressed.

According to the present disclosure, the adaptive process control system for independent steering of plant control systems are achieved, particularly, in that by means of the adaptive process control system for independent steering of plant control systems, wherein a plant associated with the plant control system includes a plurality of interlocked elements of one or more operational unit of the plant, wherein the operation of an operational unit is controlled by the plant control system by means of the elements interlocked to the plant control system, and wherein the adaptive, independent process control system is accessible by a plant process engine, in that the plant process engine includes a plant controller unit connected via the supervisory control and data acquisition unit with at least one programmable logic controller (PLC) of the plant control system, wherein the operation of the plant and the operational units are controlled by means of the programmable logic controller (PLC) and the plurality of interlocked elements, in that the plant process engine includes a plant creator unit with a library of selectable process control command records for each type of plant control system operatable by the independent process control system, wherein the operation of a corresponding plant is steerable by the process control command assigned to a specific type of plant control system by the selectable process control command records, in that the plant process engine includes an object linking and embedding unit for process control, wherein the selectable process control command of the library are converted by the object linking and embedding unit for process control into basic programmable logic controller (PLC) commands and/ or operations integrated by all programmable logic controller (PLC) of the accessible plant control system. The supervisory control and data acquisition unit can e.g. be operationally connected to the plant control system by means of OPC-UA open-standard architecture expanding interoperability of the object linking and embedding unit for process control between plant control systems and the independent process control system. Further, the programmable logic controller (PLC) of the supervisory control and data acquisition unit can e.g. include a programmable logic controller (PLC) connected to the plant control system by means of OPC-UA open-standard architecture expanding interoperability of the object linking and embedding unit for process control between secured plant control systems and the client device. The plant creator unit with the library of selectable process control command records for each type of plant control system can e.g. includes a unified programming interface, wherein the operation of a corresponding plant is programmable and operatable by using higher programming language commands over the unified programming interface, and wherein the higher programming language commands are transformed by the unified programming interface into process control command of the selectable records of the library. The higher programming language commands can e.g. include cross-platform, object-oriented programming commands. The cross-platform, object-oriented programming commands can e.g. be realized as JAVA and/or JavaScript and/or XML commands. The disclosure has, inter alia the advantage that regarding the hardware, the disclosure reduces the costs by implantation of local suppliers combined with locally develop designs, which meet the market demands as needed. The hardware platform will be more flexible since the disclosure is able to integrate not only existing standard platforms, but also alternative platforms. For example in regard to roller mill plant, the disclosure allows to integrate existing standard platforms as Siemens and/or Allen Bradley, but also the alternative platforms like Schneider, GE or Beckhoff. Thus, the disclosure is a functional, platform-independent system for providing plant control, steering, in particular standard independent remote steering, and automation. Automated processes and process commands can be remotely captured and controlled, wherein remote intervention and process adaption remains possible at all times. Through the combination of platform and standard-independent control, company-internal know-how can be optimally protected, without e.g. insights of the plant control system provider. The plant control system further remains flexible adaptable to changing individual or specific operational requirements. The decentralized and adaptable plant control system with the automatic operation control allows for optimized and up-to-date process sequences, without on-site plant control system adaption, inter alia allowing for a significant increase in up-to-date plant capacity and ensuring high level of production quality. Further, production planning, diagnostics and quality assurance can be carried out with the disclosure process and plant control system, in a new way not possible with the prior art systems, which simplifies planning and maintenance of the remote plant control system considerably. Finally, the adaptive system also reduces the need of maintenance personnel significantly, thus lowering production cost.

In one embodied variant of the adaptive, independent process control system, additional, the adaptive, independent process control system includes an adaptable human machine interface (HMI), wherein the supervisory control and data acquisition unit and the plant creator unit and the plant controller unit can be accessed by the adaptable human machine interface, and wherein the supervisory control and data acquisition unit operationally connected to form a processing device to be placed in-line between the plant control system and a client device connected to the plant control system, wherein the client device includes the adaptable human machine interface, wherein the control and data acquisition unit controls secured transmission of structured data between the plant control system and a client device layer of the client device accessible by the supervisory control and data acquisition unit, and wherein the structured data is processed and analyzed by means of the supervisory control and data acquisition unit. The plant controller unit can e.g. be connected via the supervisory control and data acquisition unit with the programmable logic controller (PLC) of the plant control system is steered by the adaptable human machine interface, wherein the operational units are controlled by means of the programmable logic controller (PLC) and the plurality of interlocked elements. Further, the plant creator unit can e.g. include a library of selectable graphical pictograms, wherein the library is accessible by the adaptable human machine interface, and wherein a selectable graphical pictogram represents an operational unit of the plant, wherein the selectable graphical pictograms are arrangable by means of the adaptable human machine interface on a modifiable control flow panel of the adaptable human machine interface, wherein the operational units are configurable by means of the graphical pictograms by adaptable I/O-fields associated with the elements of the operational unit and the operation is parameterizable by means of the adaptable I/O-fields, and wherein the selected graphical pictograms of the control flow panel are connectable by selectable ladder programming objects to create an adaptable interface with a corresponding plant control system for steering the plant control system by means of the selectable process control command records. The selectable ladder programming objects can be realized as said selectable process control command records. The adaptable human machine interface can e.g. includes tracing objects dynamically tracing and indicating circuit parameters of the operation of the plant. Finally, the operation of the plant can e.g. be accessible and amendable by interacting with the tracing objects of the adaptable human machine interface. This embodied variant has, inter alia, the advantage that it provides, for a user of a plant control system, the possibility of being flexible in the choice of the used device for the human machine interface not only for the operator, but also for related services. Using e.g. HTML5 technology together with vectorized graphics and remote technology for the realization of the human user interface, the disclosure enables user to choose whatever device they like.

Finally, in addition to the system, as described above, and the corresponding method, the present disclosure also relates to a generalized human machine interface that includes computer program code means for controlling the adaptive process control system and thus the plant control system in such a manner that the plant control system performs as desired, and it relates, in particular, to a computer program product that includes a computer-readable medium containing therein the computer program code means for the processors of the adaptive process control system.

BRIEF DESCRIPTION OF THE DRAWINGS

The present disclosure will be explained in more detail by way of example in reference to the drawings in which:

FIG. 2 includes an associated object linking and embedding unit for process control, e.g. also based on OPC UA, which allows handling and communicating structured data from the PLC layer to the PC layer of the adaptive process control system for the soft PLC unit.

FIG. 5 includes a data transmission network/OPC UA Network, the OPC UA client on the process control system side, the OPC UA server of the OPC UA network, the OPC UA client on the plant control systems side, and the interpreter of the plant control systems.

DETAILED DESCRIPTION

Figure 1:
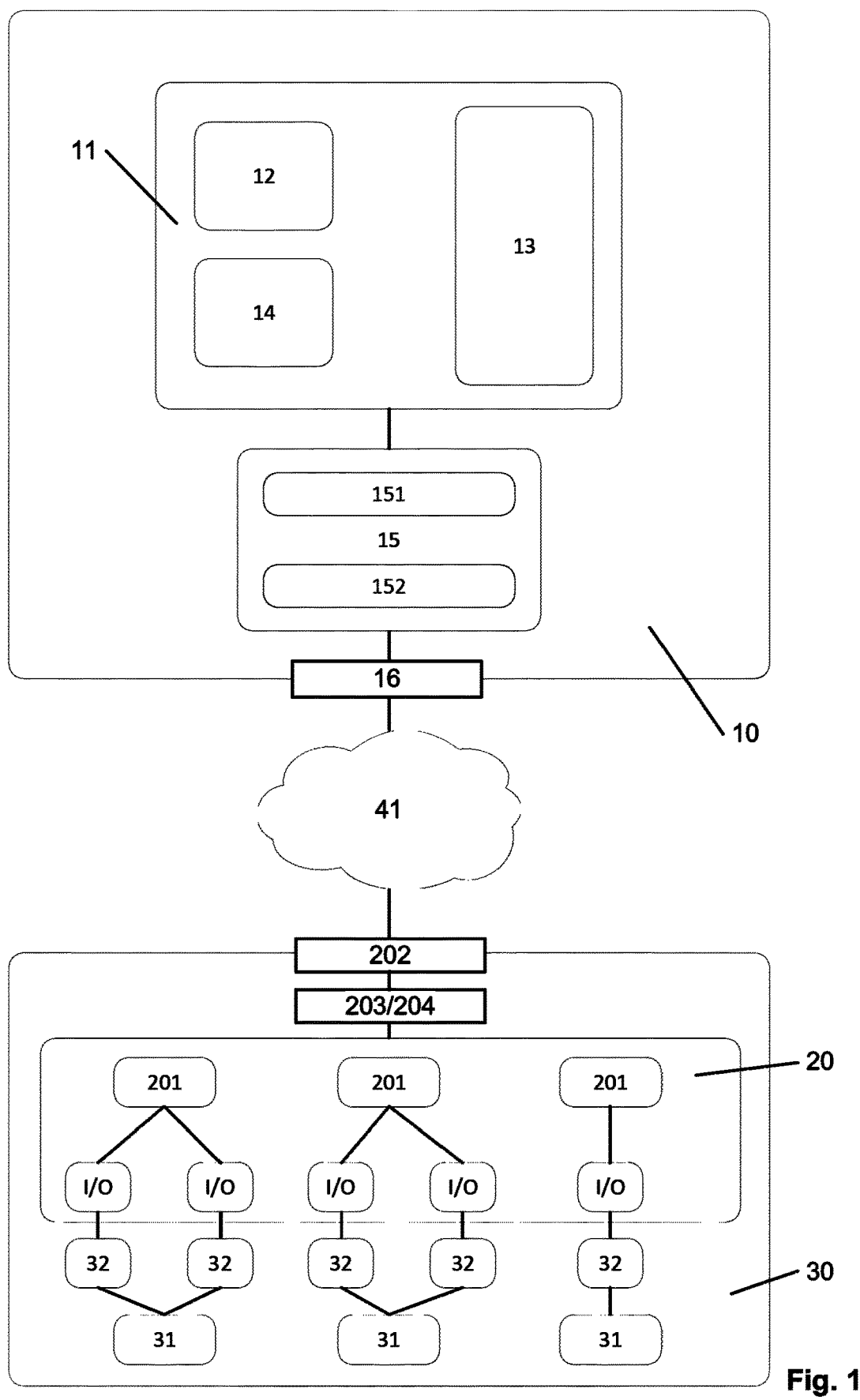
FIG. 1 shows a block diagram illustrating schematically an exemplary adaptive process control system for process controlling of plants and plant control systems in an OPC UA based Machine-to-Machine (M2M) network based on the inventive method. A plant is associated with the plant control system includes interlocked elements of one or more operational unit of the plant. The operation of an operational unit is controlled by the plant control system. The plant control system is accessible by an independent process control system in the OPC UA based Machine-to-Machine (M2M) network via network interfaces using the OPC UA clients providing OPC UA network nodes to the OPC UA server. The process control system includes a plant process engine, wherein the plant process engine includes a plant controller unit connected via the supervisory control and data acquisition unit via the input/output units (I/O) to the programmable logic controllers controlling the operation of the operational units.

FIG. 1 illustrates, schematically, an architecture for a possible implementation of an embodiment of the inventive method and system for process controlling of plants and plant control systems in an OPC UA based Machine-to-Machine (M2M) network based on the inventive method. A plant 30 associated with a plant control system 20 includes a plurality of interlocked elements 32 of one or more operational unit 31 of the plant 30. For example taking roller mills, the operational units 31 can include rollers, motors to drives the hanger of the grinding rollers, treadmills, deflectors, gates, temperature or other parameter controls as measuring devices, interrupt devices etc. etc. The operational units 31 depend on the type of plant 30 and its specific technical realization, to which the plant control systems 20 and the adaptive process control system 10 should be applied. The interlocked elements 32 create the connection between operational units 31 and the I/O elements of the plant control system 20 respectively the PLCs 201 of the plant control system 20. Thus, the plant control system 20 at least includes the PLCs 201 and their interfaces and connection to the interlocked elements 32, wherein the latter provides the accessible sensoric and/or steering and/or signaling elements to the operational units 31. In particular, the PLCs 201 connect to sensors 32, or the like, in the process and convert sensor signals to digital data. PLCs can be realized having e.g. control capabilities, as e.g. IEC 61131-3 programming languages. In an embodiment variant, the PLCs 201 can be at least partially replaced by Remote Terminal Units (RTUs), which connect to sensors and convert sensor signals to digital data instead of a PLC 201. The RTUs can include telemetry hardware capable of sending digital data to the supervisory system, as well as receiving digital commands from the supervisory system. RTUs can have embedded control capabilities such as ladder logic in order to accomplish Boolean logic operations. The operation of an operational unit 31 is controlled by the plant control system 20 by means of the elements 32 interlocked to the plant control system 20. The plant control system 20 is accessible by an independent process control system 10 in the Machine-to-Machine (M2M) network via network interfaces 16/202. For steering and controlling the plant 30, messages containing signaling data and steering commands are transmitted between the process control system 10 and the plant control system 20.

Figure 3:
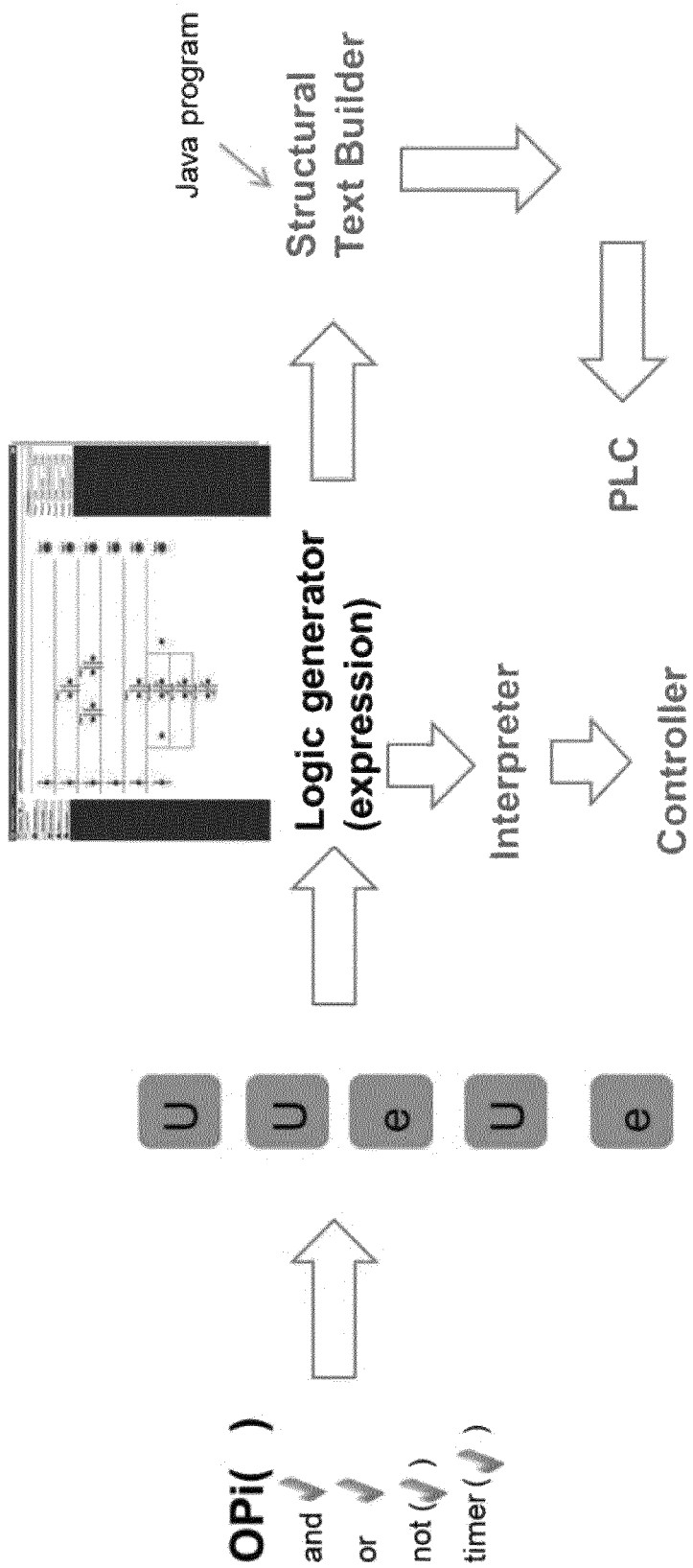
FIG. 3 shows a block diagram illustrating the interaction of the plant controller unit with the object linking and embedding unit for process control, wherein selectable process control commands are converted by the plant controller unit and/or object linking and embedding unit for process control into basic programmable logic controller commands and/or operations integrated by all programmable logic controller of the accessible plant control system. The plant controller controls the plant as a processor driven device. The interlocking and control of elements of a unit (roller mill for example) is done locally. The control of the units on the other hand is done on the PLC. This concept allows making the units less complex and allowing flexibility and easy programming on the PC using higher languages, as e.g. JAVA, for the structural text builder, i.e. the fully automated generation of the PLC steering commands. For example, the plant control unit can be at least partially realized as a JAVA programmed controller. The inventive concept allows for unidirectional programming, controlling and steering of PLCs by means of the process control system realized e.g. on the PC or even mobile processor-driven network node. In case that a complex batch control is required, the system allows for realizing an additional soft PLC for the control of the plant.

The process control system 10 includes a plant process engine 11, wherein the plant process engine 11 includes a plant controller unit 13 connected via network interfaces 16/202 to the programmable logic controllers 201/PLC controlling the operation of the operational units 31. The network interfaces 16/202 are interfacing an OPC UA network 41. Thus, the process control system 10 is connected via an OPC UA network 41 including OPC UA clients 151/203, respectively, together with an OPC UA server 152 with the at least one programmable logic controller 201/PLC of the plant control system 20. The operation of the plant 30 and the operational units 31 are controlled by means of the plant control system 20 including the programmable logic controller 201/PLC via the plurality of interlocked elements 32. So, the operation of the plant 30 and the operational units 31 are controlled via or by means of the programmable logic controller 201/PLC. The interaction of the plant controller unit 13 with the object linking and embedding unit for process control 15 is shown in FIG. 3, wherein selectable process control commands are converted by the plant controller unit 13 and/or object linking and embedding unit for process control 15 into basic programmable logic controller 201/PLC commands and/or operations integrated by all programmable logic controller 201/PLC of the accessible plant control system 20. The plant controller unit 13 controls the plant as a processor driven device. The interlocking and control of elements of a unit (roller mill for example) is done locally. The control of the units on the other hand is done on the PLC. This concept allows making the units less complex and allowing flexibility and easy programming on the PC using higher languages, as e.g. JAVA. Especially, it allows for the realization of a process control system able to unidirectionally programming and controlling PLCs of a plant control system 20. For example, the plant controller unit 13 can be at least partially realized as a JAVA programmed controller. Thus, the inventive concept allows for unidirectional programming and control of PLCs by means of the process control system 10 realized e.g. on the PC or even mobile processor-driven systems. The ready to execute PLC-steering-commands, embeddable into the OPC UA transport layer, are generated by the plant controller unit 13 realized for example with an appropriate Java engine. In case that a complex batch control is required, the system allows for realizing an additional soft PLC for the control of the plant.

In the inventive method and system, the OPC UA network 41 with the corresponding OPC UA network nodes 151/203 and 152 provide a bridge for the process control system 10 and process control hardware of the plant 30. For data transmission by means of the OPC UA network 41, the disclosure uses the OPC UA standards defining consistent accessing field data from plant floor devices. The used OPC UA structure remains the same regardless of the type and source of data. The OPC server 152 provides for a hardware device the same accessing for any OPC client 151/203 to access each others data. Thus, the disclosure reduces the amount of duplicated effort required from hardware manufacturers and their software partners, and from the SCADA and other HMI producers in order to interface the two. Once a hardware manufacturer integrated the OPC client 203 and the interpreters 204 for a new plant 30, plant control system 20, or appropriate hardware device, the plant 30 plant control system 20, or appropriate hardware device can be accessed, controlled and operated by the process control system 10. Further, the SCADA producer does not has to care about accessing to any hardware, existing or yet to be created, since this is provided by the process control system 10, the supervisory control and data acquisition unit 12 being an integrated part of the process control system 10. As an embodiment variant, the OPC UA server 152 or OPC UA for Soft PLC 153 is generated on or as integrated part of the process control system 10. However, the OPC UA server 152 can also be realized as an independent network component respectively node of the OPC UA network 41, e.g. as a connection point, a redistribution point, or a communication endpoint (e.g. data terminal equipment). The OPC UA network 41 is realized on a physical network 41. For the data communication, the OPC UA clients 151/203 and the OPC UA server 152 can be based on a physical network node including a data communication equipment (DCE) and/or a data terminal equipment (DTE). As discussed below in detail, the physical network 41 can include a LAN or WAN, wherein the OPC UA clients 151/203 and OPC UA server 152 can be associated with a LAN or WAN node. In this case, these LAN or WAN nodes are data link layer devices having a MAC address, typically one for each network interface controller it possesses, e.g. computers, packet switches, xDSL modems (with Ethernet interface) and wireless LAN access points. If the network 41 includes the Internet or an Intranet, the physical network nodes can be realized on host computers, also known as Internet nodes, identified by an IP address.

OPC server 152 provides a method for many different software packages (so long as it is an OPC client 151/203) to access data from process control system, such as the plant control system 20, PLCs 201 or distributed control systems (DCS). Traditionally, any time a package needed access to data from a device, a custom interface, or driver, had to be written. One of the advantages of the present disclosure using OPC UA is to provide a common interface and process control system 10 that is written once and then reused by any plant control system 20, in any industrial field, with any SCADA, HMI, or custom software packages. As long as the control of the plant 30 is interfaced by the OPC UA clients 203, the plant control system 20 can be realized directly by means of PLCs 201, by a distributed control system (DCS), which is a control system for a process or plant, wherein control elements are distributed throughout the system, or a non-distributed system, which use a single controller at a central location. In a DCS, a hierarchy of controllers is connected by the OPC UA clients 203 for command and monitoring.

Examples of such plant control systems 20, are those e.g. of mill plants, chemical plants, petrochemical (oil) and refineries, boiler controls and power plant systems, nuclear power plants, environmental control systems, water management systems, metallurgical process plants, pharmaceutical manufacturing, sugar refining plants, dry cargo and bulk oil carrier ships, formation control of multi-agent systems etc. Apart from the OPC UA client 203 interfacing the OPC UA network 41, the plant control systems 20 may use custom designed processors as controllers and/or use both proprietary interconnections and standard communications protocol for internal communication, as e.g. distributed control system. Input and output modules form component parts of the plant control systems 20. Such a processor may receive information from input modules and sends information to output modules. The input modules receive information from input instruments in the process (or field) and the output modules transmit instructions to the output instruments in the field. The inputs and outputs can be either analog signal, which are continuously changing, or discrete signals, which are e.g. two states, either on or off. Computer buses or electrical buses connect the processor and modules through multiplexer or demultiplexers. Buses can also connect the distributed controllers with a central controller and/or finally to a Human-machine interface (HMI) or localized control consoles. The elements of the plant control systems 20 may connect directly to physical equipment such as switches, pumps and valves and/or via the data transmission network respectively OPC UA Network 41 to the Human Machine Interface (HMI) of the process control system 10 via the supervisory control and data acquisition unit 12 (SCADA). As Embodiment variant, the functionality of the plant control systems 20 and the supervisory control and data acquisition unit 12 may even be realized to partially overlap. Thus, the plant control systems 20 is a dedicated system used to control manufacturing processes that are continuous or batch-oriented, such as mill plants, oil refining, petrochemicals, central station power generation, fertilizers, pharmaceuticals, food and beverage manufacturing, cement production, steelmaking, and papermaking. The plant control systems 20 is connected to sensors and actuators and use setpoint control to control the flow of material through the plant. The most common example is a setpoint control loop consisting of a pressure sensor, controller, and control valve. Pressure or flow measurements are transmitted to the controller, usually through the aid of a signal conditioning an input/output (I/O) device. When the measured variable reaches a certain point, the controller instructs a valve or actuation device to open or close until the fluidic flow process reaches the desired setpoint. Large mill plants or oil refineries have many thousands of I/O points and may employ a very large plant control systems 20. Processes are not limited to fluidic flow through pipes, however, and can also include things like paper machines and their associated quality controls, variable speed drives and motor control centers, cement kilns, mining operations, ore processing facilities, and many others. The plant control systems 20 may include technologies as wireless systems and protocols, remote transmission, logging and data historian, mobile interfaces and controls, and embedded web-servers. Preferably, the plant control systems 20 becomes centralized at plant level, easing to realize the ability to log in by remote equipment and the process control system 10. This facilitates the realization of the process control system 10 with its human-machine interface (HMI) especially from the point of view of remote access and portability.

The process control system 10 includes a plant process engine 11 with a library 141 of selectable process control command records 142 for each type of plant control system 20 operatable by the independent process control system 10. The operation of a corresponding plant is steerable by the process control command assigned to a specific type of plant control system 20 by the selectable process control command records. The plant process engine 11 includes an object linking and embedding unit for process control 15. The selectable process control commands of the library 141 are converted by the object linking and embedding unit for process control 15 into basic programmable logic controller 201/PLC commands and/or operations integrated by all programmable logic controller 201/PLC of the accessible plant control system 20. The OPC UA clients 151/203 based on the OPC Unified Architecture are generated each on the process control system 10 and on the plant control system 20, the transport layer between the OPC UA client 151 of the process control system 10 and the OPC UA client 152 of the plant control system 20 being extended bidirectionally by means of a defined bit sequence containing encoded programmable logic controller (201/PLC) messages, and the OPC UA clients 151/203 being OPC UA network nodes in the OPC UA network 41 with the OPC UA server 152, as captive portal. For steering and controlling the plant 30, the process control system 10 transmits programmable logic controller 201/PLC command messages to the plant control system 20 by encoding the PLC command messages for the OPC UA transport layer and transmitting it in the OPC UA transport layer by means of the defined bit sequence. Thus, the encoded PLC command messages of the OPC UA transport layer include PLC steering commands. As a variant, the encoded PLC command messages can further include authentication data, which can include e.g. an identity (ID) reference and/or password and/or hash value and/or IMSI of a SIM card, so that the corresponding OPC UA client 151/203 can be securely addressed by the system 10 and/or plant control system 20. The plant control system 20 decodes the PLC command messages by means of the interpreter 204 from the defined bit sequence and transmits the decoded PLC command messages to the corresponding PLC 201 for execution. The plant control system 20 transmits in the OPC UA transport layer by means of the defined bit sequence encoded PLC response messages to the OPC UA client 151 of the process control system 10. The process control system 10 decodes and processes the PLC response messages from the bit sequence for controlling and steering the operation of the plant 30. The PLCs 201 of the plant control system 20 interprets the PLC-commands generated by means of the plant control unit 13, for example realized with an integrated high-programming language engine, as e.g. Java engine, either directly, as decoded form the OPC UA transport layer, or it is interpreted by an additional software-based unit interacting between the interpreter 204 and the PLCs 201 or being realized as a part of the interpreter 204. It is important to note, that the inventive structure of the process control system 10 and the plant control system 20 allows for a unidirectional programming of the PLCs, i.e. a unidirectional steering of the plant 30 and the plant control system 20, respectively, completely remote over a network by means of the process control system 10.

The network interface 16 of the process control system 10 and the network interface 202 of the plant control system 20 may include a wireless network interface, e.g. a wireless network interface card (NIC). The connection between the OPC UA client nodes 151/203, i.e. between the process control system 10 and the plant control system 20 can also be realized by wired network interfaces 151 or 203 e.g. by Ethernet. GIS from IPASS works also with nomadic wired access. Thus, the process control system 10 and the plant control system 20 include all necessary infrastructure including hardware and software components at its disposal to achieve the described network access and data transmission over the network 41 according to the disclosure. The data transmission network 41 can include the known Internet, as worldwide backbone network. The process control system 10 can be realized associated with all possible kinds of so-called Customer Premise Equipment (CPE) that is provided for use at various network locations and/or in various networks. Moreover, the OPC UA network node 151, e.g. realized on a CPEs, and the OPC UA network node 203 can access the network 41 by one or more different physical network interfaces 16/202 that are also able to support a plurality of different network standards. The reference numerals 16/202 are therefore appropriate network interface cards (NICs). The physical network interfaces of the nodes can include, for instance, interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another Wired LAN (Local Area Network) etc. The reference number 41 can be based on IEEE 802.11 or other standards or can include different heterogeneous networks such as, for example, a Bluetooth Network, e.g. for installations in roofed-over areas, a mobile radio network with GSM and/or UMTS, etc., a wireless LAN, e.g. based on IEEE wireless 802.1x, or also a wired LAN, i.e. a local fixed network in particular also the PSTN (Public Switched Telephone Network), etc. In principle it is to be said that the method and/or system according to the disclosure is not tied to a specific network standard, provided that the features according to the disclosure are present, but can be achieved with any realized OPC UA network technical structure. The interfaces 16/202 of the network nodes 151/203 can not only be packet-switched interfaces such as are used directly by network protocols such as e.g. Ethernet or Token Ring, but can also be circuit-switched interfaces that can be used with protocols such as PPP (Point to Point Protocol, see IETF RFC), SLIP (Serial Line Internet Protocol) or GPRS (Generalized Packet Radio Service), i.e. those interfaces for example that do not have a network address such as a MAC or a DLC address. As partially mentioned before, the communication can, for example, take place over the LAN for instance by means of special short messages, e.g. SMS (Short Message Services), EMS (Enhanced Message Services), over a signaling channel such as e.g. USSD (Unstructured Supplementary Services Data) or other technologies, like MExE (Mobile Execution Environment), GPRS (Generalized Packet Radio Service), WAP (Wireless Application Protocol) or UMTS (Universal Mobile Telecommunications System), or over IEEE wireless 802.1x or via another user information channel.

The supervisory control and data acquisition unit 12 operates with coded signals over communication channels 40 providing control of remote equipment, i.e. the programmable logic controllers 201/PLC controlling the operation of the operational units 31, for example by using one communication channel per remote station, i.e. a plant control system 20, or a programmable logic controllers 201/PLC. The supervisory control and data acquisition unit 12, in the present case, addresses amongst other things the process of monitoring and processing data analysis. The supervisory control and data acquisition unit 12 can be realized as pure, web-based system. The backbone of the supervisory control and data acquisition unit 12 can be realized using OPC UA (OPC Unified Architecture), which allows the system to handle and communicate structured data from the PLC layer to the plant process engine 11, wherein the plant process engine 11 can, for example, be realized as processor-based and/or process-driven unit or system or more general based on normal computer hardware, as a PC (Personal Computer). OPC UA provides the technical Machine-to-Machine (M2M) communication protocol for interoperability developed by the OPC (Open Platform Communications) Foundation. M2M refers to technologies that allow both wireless and wired systems to communicate with other devices of the same type. M2M may include technical instrumentation including devices (such as a sensor or meter) to capture an event (such as temperature, inventory level, etc.) that is relayed through a network (wireless, wired or hybrid) to an application (software program) that translates or transforms the captured event into technical otherwise necessary information (as for example signaling by triggering predefined events). The base services of the OPC UA communication protocol are abstract method structures, which are protocol independent and provide the basis for OPC UA functionality. But for all its interoperability, the transport layer of OPC UA merely puts this structure into a protocol, which means it serializes/deserializes the data and transmits it over the network. Two protocols are specified for this purpose. One is a binary TCP protocol, optimized for high performance and the second is Web service-oriented. In its core, OPC UA is a mere information transport structure, whereas the OPC information model is based on a Full Mesh Network with corresponding nodes. The nodes can include any kind of meta information. These nodes can own attributes for read access (DA, HDA), commands, and triggered events that can be transmitted (AE, DataAccess, DataChange). Nodes hold for process data as well all other types of metadata, whereas the transmitted data and/or metadata are not type-specific transmittable. OPC UA supports two protocols, one being a binary protocol and the other the normal Web Service protocol (http). Additionally, OPC UA works completely transparent to any Application-programming interface (API). Typically, the binary protocol offers the best performance/least overhead, takes minimum resources (no XML Parser, Simple Object Access Protocol (SOAP) and Hypertext Transfer Protocol (HTTP) required, which is important for embedded devices), offers best interoperability (binary is explicitly specified and allows fewer degrees of freedom during implementation) and uses a single arbitrarily choosable TCP port for communication easing tunneling or easy enablement through a firewall.

Figure 4:
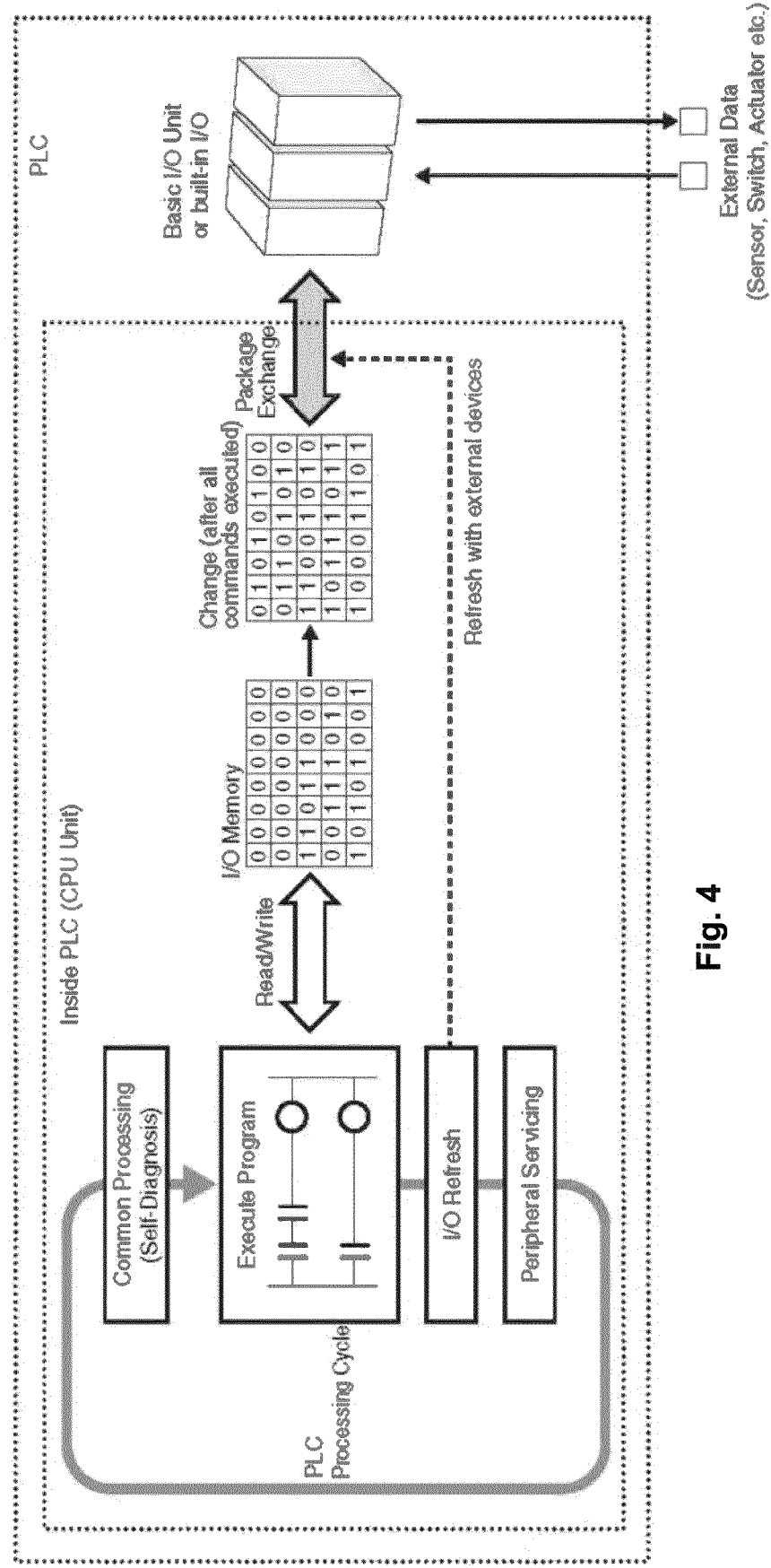
FIG. 4 shows a block diagram illustrating schematically the steering and I/O Refresh operation of the PLC, wherein the I/O Refresh operation is performed following the execution of other commands.

As mentioned, the operation of the plant 30 and the operational units 31 are controlled by means of the programmable logic controller 201/PLC and the plurality of interlocked elements 32, as e.g. sensors. With the programmable controllers (PLC), commands from control, monitoring and steering programs are executed one by one and processed by reading and writing information in the internal PLC memory area, which is typically called I/O Memory. Packages of data from sensors/switches that are directly connected to the basic I/O unit are exchanged with data in the PLC internal I/O Memory, at specific times. This process to totally exchange external data and internal I/O memory data is called I/O Refresh Operation. The timing by which the I/O Refresh will be executed when considering the operation of the plant control system and execution code built to steer the plant. In a preferred case of the PLC, this I/O Refresh operation is performed immediately following the execution of all other commands, as shown in FIG. 4. In this structure, the supervisory control and data acquisition unit 12 is realized to address the process visualization and the process data analysis. The backbone of the supervisory control and data acquisition unit 12 is the object linking and embedding unit for process control 15, e.g. based on the above discusses OPC UA transport, which allows to handle and communicate structured data from the PLC layer to the PC layer of the adaptive process control system 10. The object linking and embedding unit for process control 15 is described in detail below.

Figure 5:
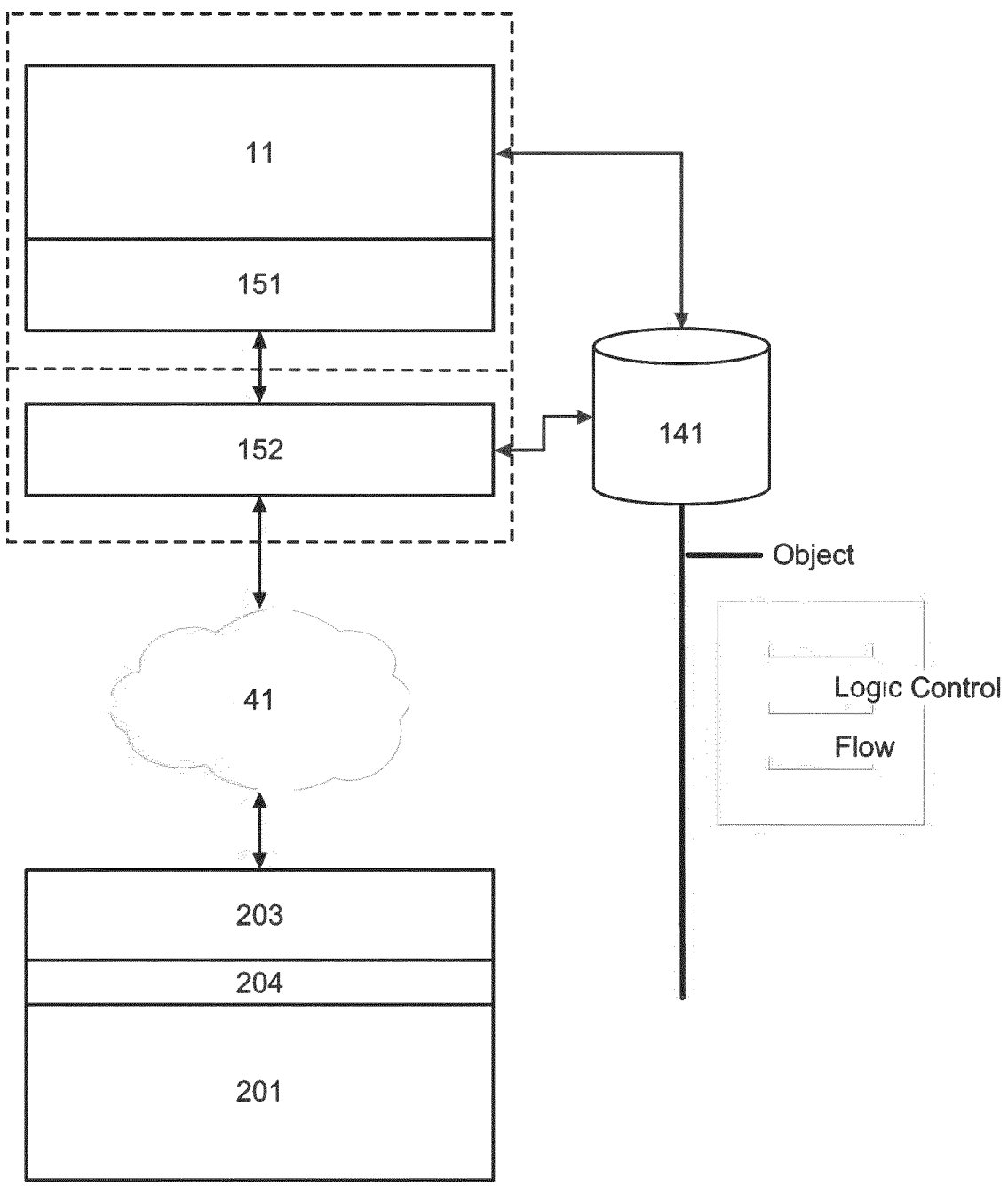
FIG. 5 shows a simplified block diagram illustrating schematically an exemplary adaptive process control system for independent steering of plant control systems.

FIG. 5 illustrates schematically the OPC UA structure between the process control system 10 and the plant control system 20 and the PLCs 201. The adaptive process control system 10 includes the necessary processor-driven hardware as e.g. a PC or the like, the OPC UA client coupling to the process control system 10/41, 152 is the OPC UA server, and the OPC UA client coupling to the interpreter 204, wherein the latter is interfacing the plant control system 20 and the PLCs 201, respectively. As variant, the OPC UA client may verify what the server support. Thus, it can obtain information, if a server, for example, only supports DA functionality or additionally AE, HDA, etc. The OPC UA client and the interpreter 204 can be realized together with the PLCs 201 as (integrated) part of the plant control system 20, for example.

The supervisory control and data acquisition unit 12 can be based 100% on web technology. As illustrated by FIG. 5, the main data gateway of the supervisory control and data acquisition unit 12 is based on OPC UA, which enables to communicate structured data from the process control system 10/41, e.g. realized on a PC, to the PLC 201 and vice versa. For PLC types, which do not support the OPC UA the driver or interpreter 204 is used in order to translate the protocol. The complete system may at least consist of the following elements: (i) The supervisory control and data acquisition unit 12 as server (running on PC based hardware) is connected to the PLC via OPC UA directly or via an OPC driver. Supervisory control and data acquisition unit 12 (SCADA) may use an integrated web server for the plant creator unit 14 and the Human Machine Interface (HMI). The supervisory control and data acquisition unit 12 itself can act not only as an OPC UA client but also as the OPC UA server 3, which is used to communicate with the PLC 201, the controller, i.e. the plant controller unit 13, the system of the supervisory control and data acquisition unit 12, a possible archive tool and others, (ii) The plant creator unit 14, which is the tool for the engineers to design and configure the actual plant, (iii) A runtime HMI with which the end user supervises and controls the plant 30, (iv) Long-term statistics may be stored and managed in an external archive tool with its own reporting tool, (v) An historian may also be installed on a separate system, (vi) The plant controller unit 13, which is the core module for the process control. It controls the interlocking, the flow (start and stop sequences), manages jobs and data, controls lines and sections, and implements functions like bin management, contamination control, parameter handling, (vii) The OPC-UA capable PLC 201, which are connected directly with the OPC-UA server, other PLCs can be connected via an OPC driver, and (viii) Possibly a web browser interface, whereas the engineering with the plant creator unit 14 as well as the operation of a plant 30 can be run in a web browser.

Figure 2:
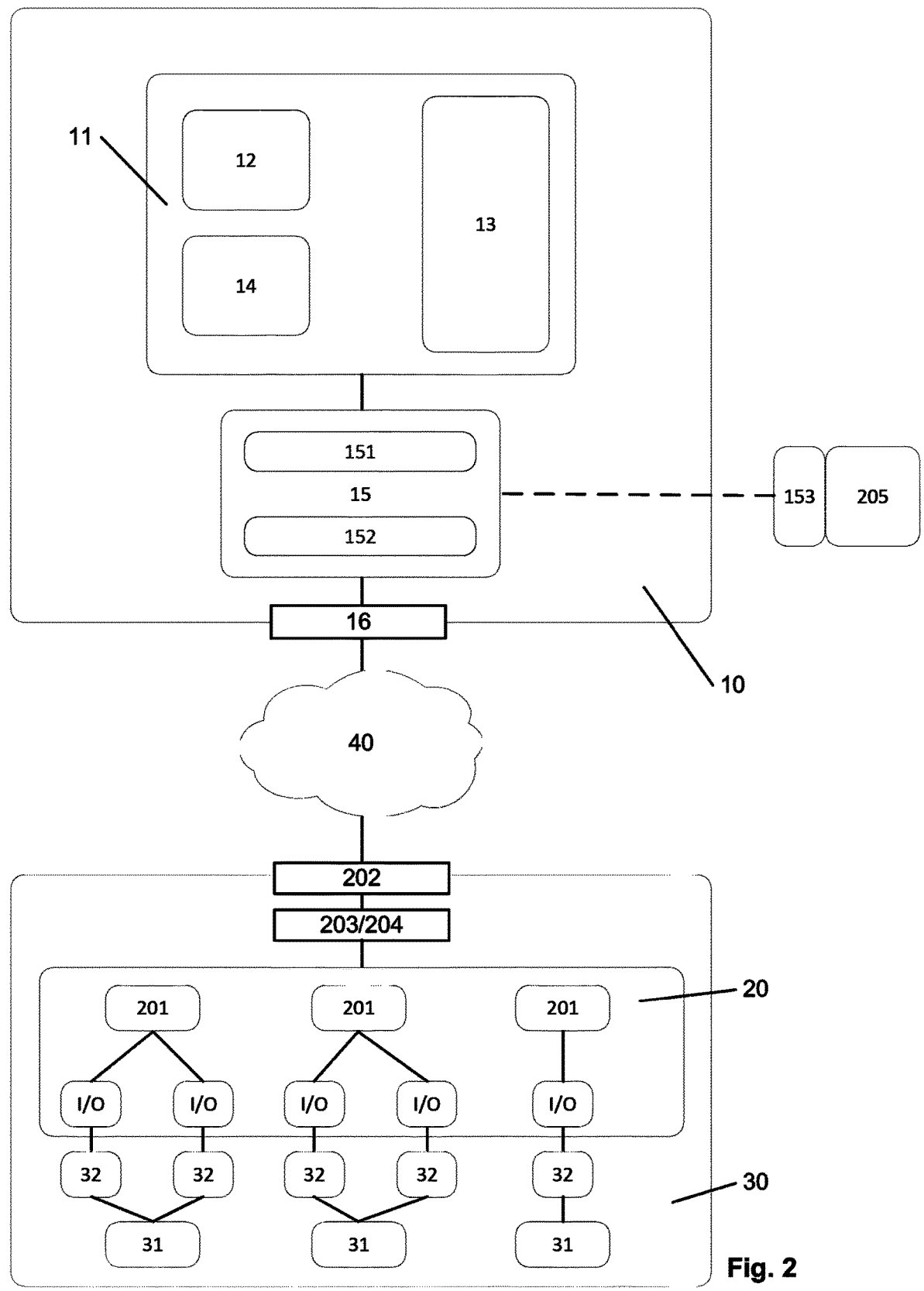
FIG. 2 show further block diagrams illustrating schematically an exemplary adaptive process control system for process controlling of plants and plant control systems in an OPC UA based Machine-to-Machine (M2M) network based on the inventive method. For providing a complex batch control, a soft PLC unit is added for the control of the plant.

The above mentioned plant controller unit 13, as part of the adaptive process control system 10, controls the plant 30 and the plant control system 20 from a PC, if the adaptive process control system 10 is realized on a PC. The interlocking and control of the operational units 31 of a plant 30 (for example roller mill plant) is done locally on the adaptive process control system 10. The control of the operational units 31 on the other hand is done on the PLCs 201. This concept allows to make the units less complex and allow flexibility and easy programming on the PC using higher languages like JAVA. As embodiment variant of providing a complex batch control, a soft PLC unit 205 for the control of the plant can be added, as shown in FIG. 2. The reference numeral 151 in FIG. 2 is an associated object linking and embedding unit for process control, e.g. also based on OPC UA, which allows to handle and communicate structured data from the PLC layer to the PC layer of the adaptive process control system 10 for the soft PLC unit 205.

Regarding the PLC processing cycle, typically, the cycle time is the time from the execution (commencement) of the I/O Refresh operation to the execution (processing) of the following I/O Refresh. The cycle time includes time for overhead processing (self-diagnosis), execution of user programs, I/O Refresh processing and the processing of peripheral services. When the cycle time is long, the cycle for updating data from outside of the PLC and the I/O response time are also longer, thus making it not possible to implement changes that are input at a rate faster than the cycle time. When the cycle time is short, I/O response time is also shortened, which allows high speed processing. As the cycle time changes, the command execution cycle and I/O response times also change. Commands, transmitted by the adaptive process control system 10 are executed in order along with the processing of the I/O Refresh etc., within the PLC processing cycle. Interrupt Tasks however can e.g. be executed in precedence to this processing cycle. In the event that certain interrupt conditions are met, the processing cycle will be suspended and the interrupt tasks will be executed first. For example, interrupt tasks can include power off interrupt, scheduled interrupts, I/O interrupts, periodic interrupts based on an internal timer, and external interrupts.

In order for the adaptive process control system 10 to utilize I/O signals from the I/O Units mounted to the PLC, it is necessary to first assign an address within the PLC I/O Memory. The assignment of I/O Memory to the input or output from these units within the PLC is known as I/O allocation. This I/O allocation information is used in the operation of I/O Refresh with connected units, as the adaptive process control system 10. In the present case of interaction of the adaptive process control system 10 with the PLCs 201 of the plant control system 20, this I/O allocation information can e.g. be recorded in the PLC in the "Registered I/O Table". This "Registered I/O Table" can be created by either automatically registering online with the adaptive process control system 10 utilizing information from the unit built-in to the PLC, or by using the adaptive process control system 10 to design offline and then automatically registering by transmitting the I/O table to the PLC. However, some plant control systems 20 may not require the creation of a Registered I/O Table, and others may not support the offline design of I/O Tables.

The PLCs 201 typically utilizes a variety of different data including external program codes as commands transmitted by the adaptive process control system 10, I/O memory data and comments, CPU unit and special I/O unit's parameters, and Registered I/O Table information etc. All of this data, used by the PLC 201, is stored in a memory area within the CPU unit of the PLC 201. The memory area of the PLC 201 typically includes a user program area, which records user programs transmitted by external devices as the adaptive process control system 10. Further, it includes an I/O memory area, which is accessed by command operands. It records information such as the CIO, Internal I/O Area, holding area, auxiliary area, DM Area, EM Area, Timer Completion Flags/Present Value, Completion Flag/Present Value, Task Flags, Index Register, Data Register, Condition Flags, Clock Pulse, etc. The data in the I/O memory area are normally located in areas in which the contents are cleared every time the power is turned back on, and areas in which prior information is retained. Finally, it includes a parameter area, which contains all of the information regarding initial parameters used by the PLC. This memory area records information such as the PLC System Parameters, Registered I/O Table, Routing Table, and PLC Setup for CPU Bus unit. The PLCs 201 include basic functions already and commonly installed in the PLCs 201. However, by adding PLC-based process control units to the basic system configuration, PLC 201 process control functions can be simply added on to the basic functions already installed in the PLCs 201. It is important to note, that for the plant control system 20, these additional PLC 201 process control functions are manufacturer-specific. Thus, it can only be used for devices that it is compatible with the process control system in which the plant control system 20 was used before or devices in which several controllers were used combined and which are compatible. One big advantage of the present disclosure is, that adaptive process control system 10 does only use the basic functions already installed in the PLCs 201, and is therefore usable platform and manufacturer independent with all possible types of plant control systems 20.

Note that most of the software engineering may consists of e.g. visual programming, configuration and modeling, for which the skill is easy available in the technology field. The main PLC 201 software can be reduced to a minimum and only contains the basic control of each device, using in most cases a graphical language called ladder diagram, which is a standardized IEC 61131-3 programming language, mostly understood by electrical staff. The start-up, shut-down and interlocking of each unit which is programmed in the PLC 201 are controllable by means of the inventive system by means of flowcharts represented and executed within a PC, running the process control system 10, in a graphical manner, which simplifies not only the engineering of the project, but also makes it possible for any man skilled in the art to understand and verify the process. These flowcharts can form part of the system specification requirement and replace the written explanation of the control functionality in a graphical manner easily understood by anyone. This approach also increases the flexibility to address individual customers- and the often-changing local market needs.

The inventive system allows the generation of the automation of a plant control system, which includes hardware as switchboards, control enclosures, PLCs (programmable logic controller), cabling, and/or processor driven systems as PC, and software (engineering and processing software) by means of the generation of the platform-independent process control system system 10 with the interpreter 204. It allows to move an essential part of the steering, which normally is executed on the PLC 201, to the process control system system 10 for example running on a PC. The steering can be engineered in a higher, platform independent process and operation code. The system translates the code in universal commands, which are understood by all PLCs 201. To steer the plant 30, the process control system 10 conducts the following steps: (i) Defining and generating the elements needed to steer the plant 30, (ii) Read and download the defined elements to the PLC 201 respectively the interpreter 204. For example for mills, such elements may include the 5 categories engines, valves, flaps, sensors and actors. However, any other categorization is also imaginable, and (iii) Combining the elements to units. Thus it is possible to assemble machines, sequences or any other group of elements. The inner connection of a group will be defined by means of the process control system 10. The generated connection can be seen as mask, by which the interlocking of a group can be generated by means of logic (Boolean) operators and time frames, for example in the form $U_1 = e_1$ AND $e_2$ AND $e_3$ OR $e_4$ AND $e_5$. In this manner, a group is definable and can be operated as entity on the PLCs 201.

| | | |
|---|---|---|
| - implies; if .... then | $\rightarrow$ | $x=2 \rightarrow x^2 = 4$ |
| - Material equivalence, if and only if | $\equiv \leftrightarrow$ | $x+5 = y12 \leftrightarrow x+3=y$ |
| - negation | $\neg \neq$ | $\neg(\neg A) \leftrightarrow A$ |
| - And (Conjunction) | $\wedge$ | $n<4 \wedge n>2 \leftrightarrow n=3$ |
| - Or (disjunction) | $\vee$ | $n \geq 4 \vee n \leq 2 \leftrightarrow n \neq 3$ |
| - xor (exclusive disjunction) | | $(\neg A)$ A always true, A A always false |

Figure 6:
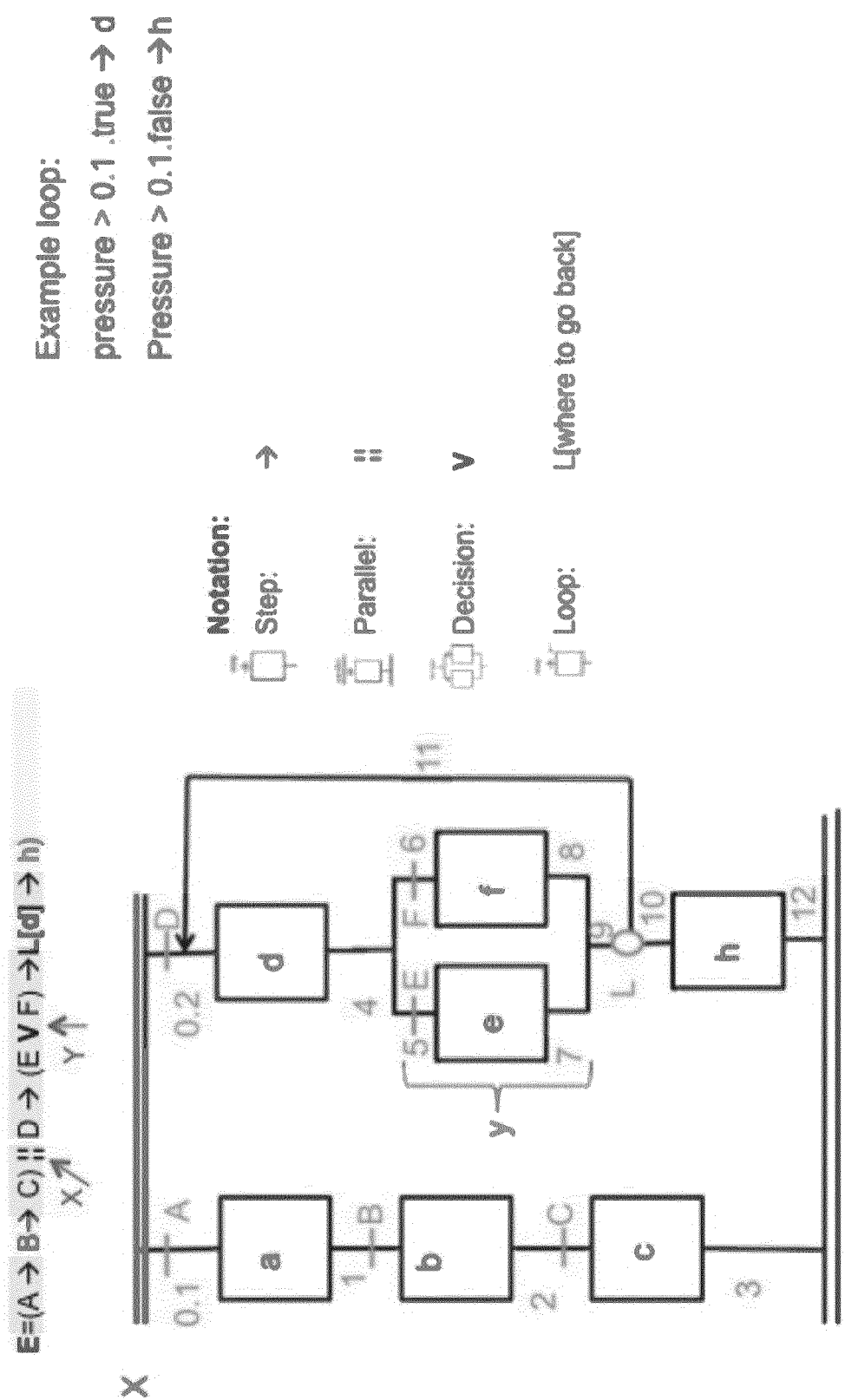
FIG. 6 shows how the above described expressions and drawings can be handled by the supervisory control and data acquisition unit or by an user via a HMI of the supervisory control and data acquisition unit.

FIG. 6 shows how the above described expressions and drawings can be handled by the supervisory control and data acquisition unit 12 or by an user via a HMI of the supervisory control and data acquisition unit 12, (iv) in the next step, it is defined how the groups or units interact with each other. This is also called the flow. The latter relations defines the whole operation of the plant 30. While the steering of the elements in a group or unit, i.e. the interlocked elements 32 with the operational units 31 takes place on the PLCs 201, the steering of the groups or units takes place on the PC and the process control system 10. The definition of the relations in the flow is also performed by the process control system 10 by means of operators adapted to the technical requirements of plant 30 automation. Therefore, a flow line can be defined in the same manner as a group, as for example $L_1 = (U_1$ AND $U_2$ AND $U_3)$ OR $(U_4$ AND $U_5)$. This defines the inter-correlation of the units, (v) both will be translated by means of the interpreter 204 in operating commands, which are understood by all PLCs 201. Manufacturer-specific requirements are interpreted by the interpreter 204 using the library 141 including the corresponding objects with logic control and flow operating structures etc. In this way, it is possible to communicate with all used PLC platforms by means of the inventive system without requiring manufacturer-specific know-how, or the like. The notation correction, conversion and the interpretation of the structural language and commands used by the process control system 10 does hide any manufacturer-specific command notation used to steer and address correctly any PLCs 201, (vi) the whole communication is based on a OPC UA platform structure, which allows communication of structured data on all levels. However, without the interaction of the interpreter 204 and the objects of the library 141, the transported structured data by means of the OPC UA cannot be used for steering the PLCs 201.

The plant process engine 11 includes a plant creator unit 14 with a library 141 of selectable process control command records 142 for each type of plant control system 20 operatable by the independent process control system 10. The operation of a corresponding plant is steerable by the process control command assigned to a specific type of plant control system 20 by the selectable process control command records. The plant process engine 11 includes an object linking and embedding unit for process control 15. The selectable process control command of the library 141 are converted by the object linking and embedding unit for process control 15 into basic programmable logic controller 201/PLC commands and/or operations integrated by all programmable logic controller 201/PLC of the accessible plant control system 20. As an embodiment variant, the supervisory control and data acquisition unit 12 is operationally connected to the plant control system 20 by means of OPC-UA open-standard architecture expanding interoperability of the object linking and embedding unit for process control 15 between plant control systems 20 and the independent process control system 10. As further embodiment variant, the programmable logic controller 201/PLC of the supervisory control and data acquisition unit 12 includes a programmable logic controller 201/PLC (so called soft PLC) connected to the plant control system 20 by means of OPC-UA open-standard architecture expanding interoperability of the object linking and embedding unit for process control 15 between secured plant control systems 20 and the client device. In this case, for providing a complex batch control for the control of the plant, a soft PLC unit 205 is added to the adaptive process control system 10, as shown in FIG. 2. The reference numeral 151 in FIG. 2 is an associated object linking and embedding unit for process control, e.g. also based on OPC UA, which allows handling and communicating structured data from the PLC layer to the PC layer of the adaptive process control system 10 for the soft PLC unit 205.

The object linking and embedding unit for process control 15 provides a standard interface that allows computer-based programs to communicate with industrial hardware devices. It can be realized e.g. based on the known standard OLE (Object Linking and Embedding) for Process Control. Since the standard OLE is based on the Windows COM (Component Object Model) standard, OPC is essentially COM. Over a network, OPC relies on DCOM (Distributed COM), which in fact is not designed for real-time industrial applications and can be set aside in favor of OPC tunneling. For the present disclosure, the object linking and embedding unit for process control 15, e.g. the OPC interface, can be implemented as server/client pairs of the adaptive process control system 10 and the PLCs 201 of the plant control system 20, controlling the operation of the plant operational units 31. Thus, the adaptive process control system 10 as OPC server converts the hardware communication protocol used by a PLCs 201 into the OPC protocol. The OPC client is any executable code that needs to connect to the hardware, such as the adaptive process control system 10 or an HMI (Human Machine Interface) of the adaptive process control system 10. The OPC client uses the OPC server to get data from or send commands to the hardware. Since the object linking and embedding unit for process control 15 based on OPC uses an open standard, the disclosure has the advantage that it lowers costs for manufacturers and more options for users. The disclosure does only to provide a single OPC server by means of the object linking and embedding unit for process control 15 together with inventive selectable process control command of the library 141 to create a generalized plant control system integrating any OPC client. Thus, the object linking and embedding unit for process control 15 is realized as a OPC DataHub, which uniquely provides all of these tasks, i.e. it combines OPC server and OPC client. As embodiment variant, the object linking and embedding unit for process control 15 can supports multiple connections.

Thus it can provide several OPC servers simultaneously, for OPC aggregation and OPC bridging. Two OPC Data-Hubs can mirror data across a TCP network to provide OPC tunneling.

The plant creator unit 14 with the library 141 of selectable process control command records for each type of plant control system 20 can e.g. includes a unified programming interface, wherein the operation of a corresponding plant is programmable and operatable by using higher programming language commands over the unified programming interface, and wherein the higher programming language commands are transformed by the unified programming interface into process control command of the selectable records of the library 141. Said higher programming language commands can e.g. include cross-platform, object-oriented programming commands. Said cross-platform, object-oriented programming commands can e.g. be realized as JAVA and/or JavaScript and/or XML commands. The latter embodiments variant allows for a simplified programming handling of the adaptive, independent process control system 10, using commonly known higher programming language commands over the unified programming interface.

The plant creator unit 14 takes care off the engineering of any customer order and create the automation solution according to the order specification. The engineering steps are generated by means of the plant creator unit 14 in a way, that the engineering time is reduced. The plant creator unit 14 can create three steps. In step one the engineer creates a flow sheet out of a library, which contains units and configure them. In the next step the control of the units is programmed in an easy ladder-programming tool. Finally the parameterizing and the visual data are configured. The plant creator unit 14 can be realized to allow process generation by using an JavaScript program. In detail, the adaptive, independent process control system 10 can include an adaptable human machine interface, wherein the supervisory control and data acquisition unit 12 and the plant creator unit 14 and the plant controller unit 13 can be accessed by the adaptable human machine interface. The supervisory control and data acquisition unit 12 can be operationally connected to form a processing device to be placed in-line between the plant control system 20 and the process control system 10. Further, a client device can be connected to the plant control system 20, wherein the client device includes the adaptable human machine interface. The control and data acquisition unit 12 controls secured transmission of structured data between the plant control system 20 and a client device layer of the client device accessible by the supervisory control and data acquisition unit 12. The structured data is processed and analyzed by means of the supervisory control and data acquisition unit 12. Further, the plant controller unit 13 can be connected via the supervisory control and data acquisition unit 12 with the programmable logic controller 201/PLC of the plant control system 20 and be steerable by the adaptable human machine interface, wherein the operational units 31 are controlled by means of the programmable logic controller 201/PLC and the plurality of interlocked elements 32.

For this embodiment variant, the plant creator unit 14 can include a library 141 of selectable graphical pictograms, wherein a selectable graphical pictogram represents an operational unit 31 of the plant 30. The library 141 is accessible by the adaptable human machine interface. The selectable graphical pictograms are arrangable by means of the adaptable human machine interface on a modifiable control flow panel of the adaptable human machine interface, wherein the operational units 31 are configurable by means of the graphical pictograms by adaptable I/O-fields associated with the elements 32 of the operational unit 31 and the operation is parameterizable by means of the adaptable I/O-fields. The selected graphical pictograms of the control flow panel are connectable by selectable ladder programming objects to create an adaptable interface with a corresponding plant control system 20 for steering the plant control system 20 by means of the selectable process control command records 142. Said selectable ladder programming objects can be realized as said selectable process control command records 142. The adaptable human machine interface can include tracing objects dynamically tracing and indicating circuit parameters of the operation of the plant 30. Finally, the operation of the plant 30 can be accessible and amendable by interacting with the tracing objects of the adaptable human machine interface.

Finally, it has to be mentioned, that a further reduction of engineering time can be achieved by using ladder programming for the control. For the interlocking, the relevant engineering tools can be used offered by the PLC suppliers. The logic of the interlocking can be split. Higher functionalities will be controlled by the adaptive process control system 10 or the corresponding PC, respectively. Customized simple solution can further be realized by splitting the functionalities in core functionalities and add-on functionalities. Add-on functionalities can e.g. be tailored according to regional needs and needs of the different business units. The core functionalities including one add-on unit, can easily be developed within the inventive adaptive process control system 10.

The invention claimed is:

1. An adaptive process control system for independent steering of a plant control system, wherein a plant associated with the plant control system comprises a plurality of interlocked elements of one or more operational units of the plant, wherein the operation of an operational unit is controlled by the plant control system using the elements interlocked to the plant control system, and wherein the plant control system is accessible by the adaptive, independent process control system via a Machine-to-Machine (M2M) network, wherein:

a plant process engine of the adaptive, independent process control system comprises a plant controller unit connected via network interfaces with at least one programmable logic controller of the plant control system, wherein the operation of the plant and the operational units are controlled using the programmable logic controller and the plurality of interlocked elements using a supervisory control and data acquisition unit;

the plant process engine comprises a plant creator unit with a library of selectable process control command records for a plurality of different types of plant control systems operatable by the independent process control system, wherein the plant process engine generates commands understandable by the programmable logic controller by selecting one process control command record from the library of selectable process control command records, and wherein the operation of a corresponding plant is generatable by the process control command assigned to a specific type of plant control system by the selectable process control command records, and wherein the operation of the plant is steerable and controllable using the supervisory control and data acquisition unit; and the plant process engine comprises an object linking and embedding unit for process control, wherein the selectable process control commands of the library are converted by the object linking and embedding unit for process control into at least one of i) basic programmable logic controller commands and ii) operations integrated by all programmable logic controllers of the accessible plant control system.

2. The adaptive, independent process control system according to claim 1, wherein the supervisory control and data acquisition unit is operationally connected to the plant control system using an OPC-UA open-standard architecture expanding interoperability of the object linking and embedding unit for process control between plant control system and the independent process control system, wherein an interpreter converts the OPC-UA protocol in the transmitted PLC commands and addresses the corresponding PLC.

3. The adaptive, independent process control system according to claim 1, wherein the programmable logic controller of the supervisory control and data acquisition unit comprises a programmable logic controller connected to the plant control system using an OPC-UA open-standard architecture expanding interoperability of the object linking and embedding unit for process control between secured plant control system and the client device.

4. The adaptive, independent process control system according to claim 1, wherein the plant creator unit with the library of selectable process control command records for a plurality of different types of plant control systems comprises a unified programming interface, wherein the operation of a corresponding plant is programmable and operatable by using higher programming language commands over the unified programming interface, and wherein the higher programming language commands are transformed by the unified programming interface into process control commands of the selectable records of the library.

5. The adaptive, independent process control system according to claim 4, wherein the higher programming language commands comprise cross-platform, object-oriented programming commands.

6. The adaptive, independent process control system according to claim 5, wherein the cross-platform, object-oriented programming commands are at least one of JAVA, JavaScript, and XML, commands.

7. The adaptive, independent process control system according to claim 1, wherein the adaptive, independent process control system comprises an adaptable human machine interface, wherein the supervisory control and data acquisition unit, the plant creator unit, and the plant controller unit are accessible by the adaptable human machine interface, wherein the supervisory control and data acquisition unit is operationally connected to form a processing device to be placed in-line between the plant control system and a client device connected to the plant control system, wherein the client device comprises the adaptable human machine interface, wherein the control and data acquisition unit controls secured transmission of structured data between the plant control system and a client device layer of the client device accessible by the supervisory control and data acquisition unit, and wherein the structured data is processed and analyzed using the supervisory control and data acquisition unit.

8. The adaptive, independent process control system according to claim 7, wherein the plant controller unit connected via the supervisory control and data acquisition unit with the programmable logic controller of the plant control system is steered by the adaptable human machine interface, and wherein the operational units are controlled using the programmable logic controller and the plurality of interlocked elements.

9. The adaptive, independent process control system according to claim 7, wherein the plant creator unit comprises a library of selectable graphical pictograms, wherein the library is accessible by the adaptable human machine interface, wherein a selectable graphical pictogram represents an operational unit of the plant, wherein the selectable graphical pictograms are arrangable using the adaptable human machine interface on a modifiable control flow panel of the adaptable human machine interface, wherein the operational units are configurable using the graphical pictograms by adaptable I/O-fields associated with the elements of the operational unit and the operation is parameterizable using the adaptable I/O-fields, and wherein the selected graphical pictograms of the control flow panel are connectable by selectable ladder programming objects to create an adaptable interface with a corresponding plant control system for steering the plant control system using the selectable process control command records.

10. The adaptive, independent process control system according to claim 7, wherein selectable ladder programming objects are the selectable process control command records.

11. The adaptive, independent process control system according to claim 7, wherein the adaptable human machine interface comprises tracing objects dynamically tracing and indicating circuit parameters of the operation of the plant.

12. The adaptive, independent process control system according to claim 11, wherein the operation of the plant is accessible and amendable by interacting with the tracing objects of the adaptable human machine interface.

* * * * *